United States Patent
Virolainen et al.

(10) Patent No.: US 10,051,396 B2
(45) Date of Patent: Aug. 14, 2018

(54) AUTOMATIC MICROPHONE SWITCHING

(75) Inventors: Jussi Virolainen, Espoo (FI); Arto Ylikoski, Kirkkonummi (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/425,137

(22) PCT Filed: Sep. 10, 2012

(86) PCT No.: PCT/IB2012/054697
§ 371 (c)(1),
(2), (4) Date: Jun. 15, 2015

(87) PCT Pub. No.: WO2014/037765
PCT Pub. Date: Mar. 13, 2014

(65) Prior Publication Data
US 2015/0312691 A1    Oct. 29, 2015

(51) Int. Cl.
| | |
|---|---|
| H04R 29/00 | (2006.01) |
| H04S 7/00 | (2006.01) |
| G10K 11/16 | (2006.01) |
| H04M 1/03 | (2006.01) |
| H04R 5/04 | (2006.01) |
| H04R 3/00 | (2006.01) |

(52) U.S. Cl.
CPC .......... *H04R 29/005* (2013.01); *G10K 11/16* (2013.01); *H04M 1/03* (2013.01); *H04R 3/00* (2013.01); *H04R 5/04* (2013.01); *H04S 7/00* (2013.01); *H04R 2410/03* (2013.01)

(58) Field of Classification Search
None
See application file for complete search history.

(56) References Cited

U.S. PATENT DOCUMENTS

| 8,411,880 | B2 * | 4/2013 | Wang | H03G 3/32 |
| | | | | 381/122 |
| 2002/0037088 | A1 | 3/2002 | Thomas et al. | |
| 2003/0179887 | A1 * | 9/2003 | Cronin | H03G 3/32 |
| | | | | 381/57 |
| 2006/0126858 | A1 * | 6/2006 | Larsen | G01H 3/00 |
| | | | | 381/63 |
| 2008/0013749 | A1 | 1/2008 | Konchitsky | |

(Continued)

FOREIGN PATENT DOCUMENTS

CN    104320527    1/2015

OTHER PUBLICATIONS

International Search Report and Written Opinion received for corresponding Patent Cooperation Treaty Application No. PCT/IB2012/054697, dated Aug. 29, 2013, 16 pages.

*Primary Examiner* — Curtis Kuntz
*Assistant Examiner* — Qin Zhu
(74) *Attorney, Agent, or Firm* — Alston & Bird LLP

(57) ABSTRACT

A method and apparatus are provided that are configured to initiate a sound capture event within an apparatus and to receive at least two audio signals during the sound capture event. The at least two audio signals are provided by at least two microphones associated with the apparatus. The method and apparatus are also configured to determine at least one microphone operational parameter based on the received at least two audio signals; and to control the sound capture event such that at least one of the at least two audio signals is processed based on the at least one microphone operational parameter.

34 Claims, 6 Drawing Sheets

(56) References Cited

U.S. PATENT DOCUMENTS

| | | |
|---|---|---|
| 2009/0190769 A1 | 7/2009 | Wang et al. |
| 2009/0196429 A1 | 8/2009 | Ramakrishnan et al. |
| 2009/0296946 A1 | 12/2009 | Zhang |
| 2010/0081487 A1 | 4/2010 | Chen et al. |
| 2010/0111324 A1 | 5/2010 | Yeldener et al. |
| 2011/0222698 A1 | 9/2011 | Asao et al. |
| 2011/0268292 A1* | 11/2011 | Suvanto ................ H04R 3/005 381/92 |
| 2011/0317848 A1 | 12/2011 | Ivanov et al. |
| 2015/0304786 A1 | 10/2015 | Partio et al. |
| 2016/0066091 A1 | 3/2016 | Kum et al. |
| 2016/0212525 A1 | 7/2016 | Nakadai |

\* cited by examiner

Figure 4. Block diagram of invention.

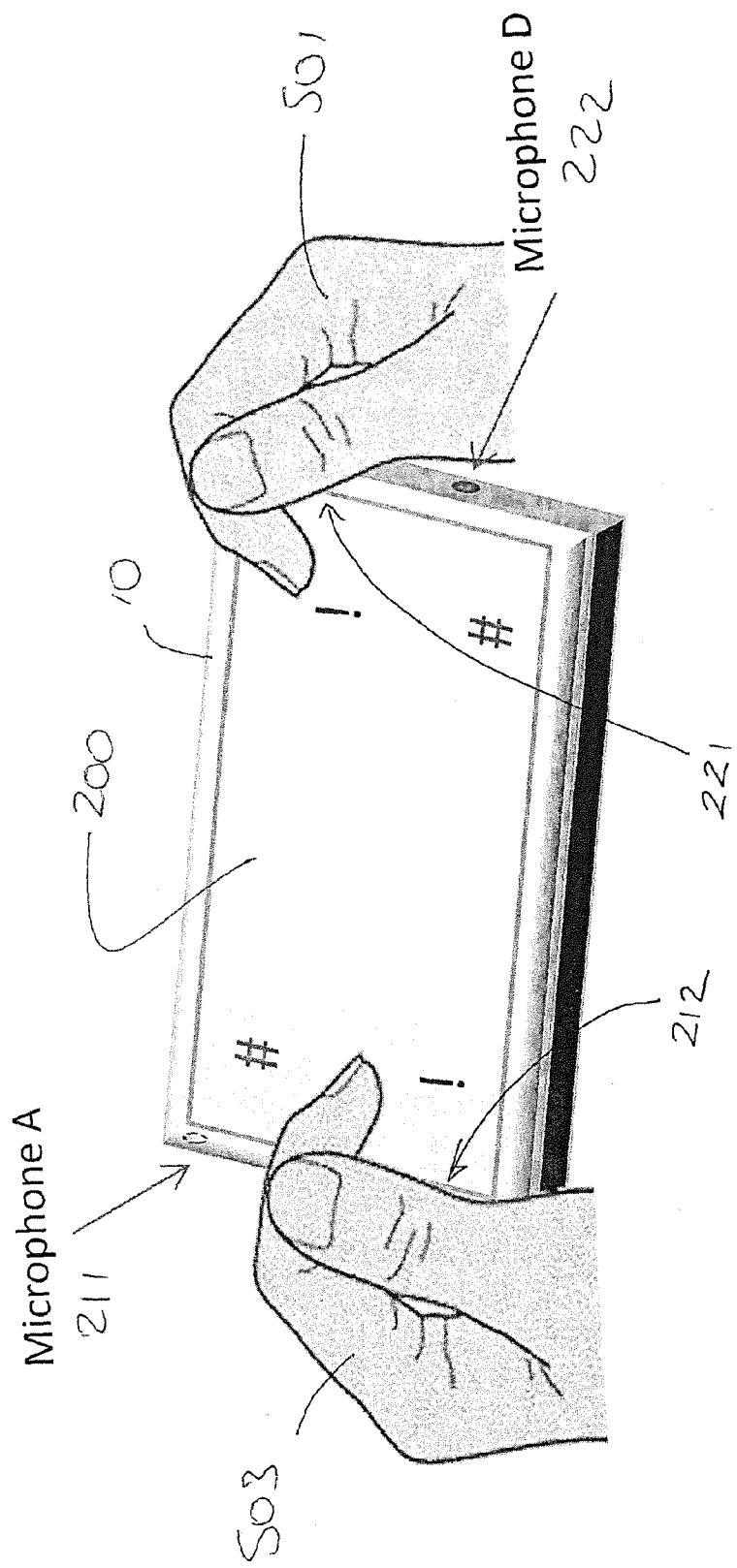

AUTOMATIC MICROPHONE SWITCHING

RELATED APPLICATION

This application was originally filed as PCT Application No. PCT/IB2012/054697 filed Sep. 10, 2012.

FIELD

The present application relates to a method and apparatus for determining impairments in integrated microphones and specifically but not only in integrated microphone in mobile apparatus.

BACKGROUND

Audio recording apparatus, for example mobile phones, can be equipped with multiple microphones for capturing acoustic energy and outputting audio signals. These audio recording systems can make use these microphones to pick-up and record audio signals from the surrounding environment. Occasionally, the operation of one or more of these microphones may become impaired. For example, a microphone may become blocked, partially blocked, shadowed (in other words the object is not directly over the microphone but can restrict any acoustic waves reaching the microphone), broken or otherwise impaired in operation.

For example, small particles such as dust may become embedded in the microphone leading to a deterioration in the operation of the microphone, a microphone may become blocked or partially blocked by a finger or other body part, a microphone may break or partially break due to a mechanical or other cause and/or a microphone may become impaired due to sound distortion introduced by environmental factors such as wind.

This may lead to a reduction in the quality of the recorded audio.

SUMMARY

According to a first aspect there is provided a method comprising: initiating a sound capture event within an apparatus; receiving at least two audio signals during the sound capture event, wherein the at least two audio signals are provided by at least two microphones associated with the apparatus; determining at least one microphone operational parameter based on the received at least two audio signals; and controlling the sound capture event such that at least one of the at least two audio signals is processed based on the at least one microphone operational parameter.

Determining at least one microphone operational parameter based on the received at least two audio signals may comprise at least one of: determining at least one of the at least two microphones are at least partially blocked; determining at least one of the at least two microphones are faulty; determining at least one of the at least two microphones are shadowed; determining the orientation of the apparatus comprising the at least two microphones; and determining a capture mode for the at least two audio signals from the at least two microphones.

Determining at least one of the at least two microphones are at least partially blocked or determining at least one of the at least two microphones are shadowed may comprise: determining at least one object is proximate to the at least one of the at least two microphones; and defining the at least one microphone as at least partially blocked or shadowed.

Determining at least one object is proximate to the at least one of the at least two microphones may comprise at least one of: determining at least one touch position is proximate to the at least one of the at least two microphones; and determining an at least partially enveloping object is proximate to the at least one of the at least two microphones.

Determining at least one object is proximate to the at least one of the at least two microphones may comprise: defining at least two regions from the at least one of the at least one of the at least two microphones; and determining the at least one object is within at least one of the at least two regions.

Controlling the sound capture event may comprise: determining at least one processing parameter where the at least one object is located within a farther of the at least two regions; and applying the at least one processing parameter to process the at least one of the at least two audio signals where the at least one object is located within a nearer of the at least two regions.

Determining the at least one object is within at least one of the at least two regions may comprise: determining using a first determining method performed at a first frequency the at least one object is located within a farther of the at least two regions; and determining using a second determining method performed at a second frequency, the second frequency being greater than the first frequency, the at least one object is located within a nearer of the at least two regions after determining the at least one object is located within a farther of the at least two regions.

Determining a capture mode for the at least two audio signals from the at least two microphones may comprise determining an output audio signal format comprising at least one channel audio signal.

Controlling the sound capture event such that the at least one of the at least two audio signals is processed based on the at least one parameter may comprise at least one of: controlling switching the microphone associated with the audio signal on; controlling switching the microphone associated with the audio signal off; controlling filtering the audio signal; controlling cross-fading at least two audio signals; controlling splitting an audio signal from the at least two audio signals into at least two channels; controlling mixing at least two audio signals; and controlling selecting a sub-set of the received at least two audio signals.

The method may further comprise processing the at least one of the at least two audio signals based on the at least one parameter, wherein processing the at least one of the at least two audio signals based on the at least one parameter may comprise at least one of: switching the microphone associated with the audio signal on; switching the microphone associated with the audio signal off; filtering the audio signal; cross-fading at least two audio signals; splitting an audio signal from the at least two audio signals into at least two channels; mixing at least two audio signals; and selecting a sub-set of the received at least two audio signals.

The method may further comprise determining a processing parameter associated with the processing the at least two audio signals based on the at least one microphone operational parameter, wherein the processing parameter comprises at least one of: at least one position of the microphone associated with the processed at least one audio signal; at least one orientation of the microphone associated with the processed at least one audio signal; at least one distance between the microphone associated with the processed at least one audio signal and a datum defined on the apparatus.

The datum defined on the apparatus may comprise the location of at least one further selected microphone.

The method may further comprise displaying the at least one microphone operational parameter on a display of the apparatus.

Displaying the at least one microphone operation parameter on a display of the apparatus may comprise: generating a graphical representation associated with the microphone operational parameter; and determining a location associated with the microphone on the display to display the graphical representation.

Generating a graphical representation associated with the microphone operational parameter may comprise at least one of: generating a graphical representation of a functioning microphone for a fully functional microphone; generating a graphical representation of a faulty microphone for a faulty microphone; generating a graphical representation of a blocked microphone for a partially blocked microphone; and generating a graphical representation of a shadowed microphone for a shadowed microphone.

Determining a location associated with the microphone on the display to display the graphical representation may comprise determining a display location adjacent the microphone of the microphone operational parameter.

According to a second aspect there is provided an apparatus comprising: a controller configured to initiate a sound capture event; at least two microphones configured to capture at least two audio signals for the sound capture event; a detector configured to determine at least one microphone operational parameter based on the at least two audio signals; an audio capture processor configured to process at least one of the at least two audio signals; and wherein the controller is configured to control the sound capture event such that at least one of the at least two audio signals is processed based on the at least one microphone operational parameter.

The detector may be configured to determine at least one of at least one of the at least two microphones are at least partially blocked; at least one of the at least two microphones are faulty; at least one of the at least two microphones are shadowed; an orientation of the apparatus comprising the at least two microphones; and a capture mode for the at least two audio signals from the at least two microphones.

The detector configured to determine at least one of the at least two microphones are at least partially blocked or at least one of the at least two microphones are shadowed may comprise: a sensor configured to determine at least one object is proximate to the at least one of the at least two microphones; and a microphone identifier configured to define the at least one microphone as at least partially blocked or shadowed.

The sensor may comprise at least one of: a proximity sensor configured to determine at least one touch position is proximate to the at least one of the at least two microphones; and a proximity sensor configure to determine an at least partially enveloping object is proximate to the at least one of the at least two microphones.

The detector may comprise: a proximity region definer configured to define at least two regions from the at least one of the at least one of the at least two microphones; and a region detector configured to determine the at least one object is within at least one of the at least two regions.

The controller may comprise: a parameter determiner configured to determine at least one processing parameter where the at least one object is located within a farther of the at least two regions; and a parameter transmitter configured to output the at least one processing parameter to the audio capture processor to process the at least one of the at least two audio signals where the at least one object is located within a nearer of the at least two regions.

The region detector may be configured to detect using a first determining method performed at a first frequency the at least one object is located within a farther of the at least two regions; and detect using a second determining method performed at a second frequency, the second frequency being greater than the first frequency, the at least one object is located within a nearer of the at least two regions after the region detector is configured to determine the at least one object is located within a farther of the at least two regions.

The detector configured to determine a capture mode for the at least two audio signals from the at least two microphones may be configured to determine an output audio signal format comprising at least one channel audio signal.

The audio capture processor may comprise at least one of: a switch configured to switch the microphone associated with the audio signal on; a switch configured to switch the microphone associated with the audio signal off; a cross-fader configured to cross-fade at least two audio signals; a splitter configured to split an audio signal from the at least two audio signals into at least two channels; a combiner configured to mix the at least two audio signals; a filter configured to filter at least one of the at least two audio signals; and a multiplexer configured to select a sub-set of the at least two audio signals.

The controller may be configured to determine a processing parameter to control the audio capture processor, wherein the processing parameter comprises at least one of: at least one position of the microphone associated with the processed at least one audio signal; at least one orientation of the microphone associated with the processed at least one audio signal; at least one distance between the microphone associated with the processed at least one audio signal and a datum defined on the apparatus.

The datum defined on the apparatus may comprise the location of at least one further selected microphone.

The apparatus may comprise a display controller configured to display on a display the at least one microphone operational parameter.

The display controller may be configured to: generate a graphical representation associated with the microphone operational parameter; and determine a location on the display associated with the microphone to display the graphical representation.

The display controller configured to generate a graphical representation associated with the microphone operational parameter may be configured to generate at least one of: a graphical representation of a functioning microphone for a fully functional microphone; a graphical representation of a faulty microphone for a faulty microphone; generating a graphical representation of a blocked microphone for a partially blocked microphone; and a graphical representation of a shadowed microphone for a shadowed microphone.

The display controller configured to determine a location associated with the microphone on the display to display the graphical representation may be configured to determine a display location adjacent the microphone of the microphone operational parameter.

According to a third aspect there is provided an apparatus comprising: means for initiating a sound capture event within an apparatus; means for receiving at least two audio signals during the sound capture event, wherein the at least two audio signals are provided by at least two microphones associated with the apparatus; means for determining at least one microphone operational parameter based on the received at least two audio signals; and means for controlling the sound capture event such that at least one of the at least two audio signals is processed based on the at least one microphone operational parameter.

The means for determining at least one microphone operational parameter based on the received at least two audio signals may comprise at least one of: means for determining at least one of the at least two microphones are at least partially blocked; means for determining at least one of the at least two microphones are faulty; means for determining at least one of the at least two microphones are shadowed; means for determining the orientation of the apparatus comprising the at least two microphones; and means for determining a capture mode for the at least two audio signals from the at least two microphones.

The means for determining at least one of the at least two microphones are at least partially blocked or determining at least one of the at least two microphones are shadowed may comprise: means for determining at least one object is proximate to the at least one of the at least two microphones; and means for defining the at least one microphone as at least partially blocked or shadowed.

The means for determining at least one object is proximate to the at least one of the at least two microphones may comprise at least one of: means for determining at least one touch position is proximate to the at least one of the at least two microphones; and means for determining an at least partially enveloping object is proximate to the at least one of the at least two microphones.

The means for determining at least one object is proximate to the at least one of the at least two microphones may comprise: means for defining at least two regions from the at least one of the at least one of the at least two microphones; and means for determining the at least one object is within at least one of the at least two regions.

The means for controlling the sound capture event may comprise: means for determining at least one processing parameter where the at least one object is located within a farther of the at least two regions; and means for applying the at least one processing parameter to process the at least one of the at least two audio signals where the at least one object is located within a nearer of the at least two regions.

The means for determining the at least one object is within at least one of the at least two regions may comprise: means for determining using a first determining method performed at a first frequency the at least one object is located within a farther of the at least two regions; and means for determining using a second determining method performed at a second frequency, the second frequency being greater than the first frequency, the at least one object is located within a nearer of the at least two regions after determining the at least one object is located within a farther of the at least two regions.

The means for determining a capture mode for the at least two audio signals from the at least two microphones may comprise means for determining an output audio signal format comprising at least one channel audio signal.

The means for controlling the sound capture event such that the at least one of the at least two audio signals is processed based on the at least one parameter may comprise at least one of; means for controlling switching the microphone associated with the audio signal on; means for controlling switching the microphone associated with the audio signal off; means for controlling filtering the audio signal; means for controlling cross-fading at least two audio signals; means for controlling splitting an audio signal from the at least two audio signals into at least two channels; means for controlling mixing at least two audio signals; and means for controlling selecting a subset of the received at least two audio signals.

The apparatus may further comprise means for processing the at least one of the at least two audio signals based on the at least one parameter, wherein the means for processing the at least one of the at least two audio signals based on the at least one parameter may comprise at least one of: means for switching the microphone associated with the audio signal on; means for switching the microphone associated with the audio signal off; means for filtering the audio signal; means for cross-fading at least two audio signals; means for spotting an audio signal from the at least two audio signals into at least two channels; means for mixing at least two audio signals; and means for selecting a sub-set of the received at least two audio signals The apparatus may further comprise means for determining a processing parameter associated with the processing the at least two audio signals based on the at least one microphone operational parameter, wherein the processing parameter may comprise at least one of: at least one position of the microphone associated with the processed at least one audio signal; at least one orientation of the microphone associated with the processed at least one audio signal; and at least one distance between the microphone associated with the processed at least one audio signal and a datum defined on the apparatus.

The datum defined on the apparatus may comprise the location of at least one further selected microphone.

The apparatus may further comprising means for displaying the at least one microphone operational parameter on a display of the apparatus.

The means for displaying the at least one microphone operation parameter on a display of the apparatus may comprise: means for generating a graphical representation associated with the microphone operational parameter; and means for determining a location associated with the microphone on the display to display the graphical representation.

The means for generating a graphical representation associated with the microphone operational parameter may comprise at least one of: means for generating a graphical representation of a functioning microphone for a fully functional microphone; means for generating a graphical representation of a faulty microphone for a faulty microphone; means for generating a graphical representation of a blocked microphone for a partially blocked microphone; and means for generating a graphical representation of a shadowed microphone for a shadowed microphone.

The means for determining a location associated with the microphone on the display to display the graphical representation may comprise means for determining a display location adjacent the microphone of the microphone operational parameter.

According to a fourth aspect there is provided an apparatus comprising at least one processor and at least one memory including computer code for one or more programs, the at least one memory and the computer code configured to with the at least one processor cause the apparatus to at least perform: initiating a sound capture event within an apparatus; receiving at least two audio signals during the sound capture event, wherein the at least two audio signals are provided by at least two microphones associated with the apparatus; determining at least one microphone operational parameter based on the received at least two audio signals; and controlling the sound capture event such that at least one of the at least two audio signals is processed based on the at least one microphone operational parameter.

Determining at least one microphone operational parameter based on the received at least two audio signals may cause the apparatus to perform at least one of: determining at least one of the at least two microphones are at least partially blocked; determining at least one of the at least two microphones are faulty; determining at least one of the at least two microphones are shadowed; determining the orientation of the apparatus comprising the at least two microphones; and determining a capture mode for the at least two audio signals from the at least two microphones.

Determining at least one of the at least two microphones are at least partially blocked or determining at least one of the at least two microphones are shadowed may cause the apparatus to perform: determining at least one object is proximate to the at least one of the at least two microphones; and defining the at least one microphone as at least partially blocked or shadowed.

Determining at least one object is proximate to the at least one of the at least two microphones may cause the apparatus to perform at least one of: determining at least one touch position is proximate to the at least one of the at least two microphones; and determining an at least partially enveloping object is proximate to the at least one of the at least two microphones.

Determining at least one object is proximate to the at least one of the at least two microphones may cause the apparatus to perform: defining at least two regions from the at least one of the at least one of the at least two microphones; and determining the at least one object is within at least one of the at least two regions.

Controlling the sound capture event may cause the apparatus to perform; determining at least one processing parameter where the at least one object is located within a farther of the at least two regions; and applying the at least one processing parameter to process the at least one of the at least two audio signals where the at least one object is located within a nearer of the at least two regions.

Determining the at least one object is within at least one of the at least two regions may cause the apparatus to perform: determining using a first determining method performed at a first frequency the at least one object is located within a farther of the at least two regions; and determining using a second determining method performed at a second frequency, the second frequency being greater than the first frequency, the at least one object is located within a nearer of the at least two regions after determining the at least one object is located within a farther of the at least two regions.

Determining a capture mode for the at least two audio signals from the at least two microphones may cause the apparatus to perform determining an output audio signal format comprising at least one channel audio signal.

Controlling the sound capture event such that the at least one of the at least two audio signals is processed based on the at least one parameter may cause the apparatus to perform at least one of: controlling switching the microphone associated with the audio signal on; controlling switching the microphone associated with the audio signal off; controlling filtering the audio signal; controlling cross-fading at least two audio signals; controlling splitting an audio signal from the at least two audio signals into at least two channels; controlling mixing at least two audio signals; and controlling selecting a sub-set of the received at least two audio signals.

The apparatus may further be caused to perform processing the at least one of the at least two audio signals based on the at least one parameter, wherein processing the at least one of the at least two audio signals based on the at least one parameter may cause the apparatus to perform at least one of: switching the microphone associated with the audio signal on; switching the microphone associated with the audio signal off; filtering the audio signal; cross-fading at least two audio signals; splitting an audio signal from the at least two audio signals into at least two channels; mixing at least two audio signals; and selecting a sub-set of the received at least two audio signals The apparatus may further be caused to perform determining a processing parameter associated with the processing the at least two audio signals based on the at least one microphone operational parameter, wherein the processing parameter may comprise at least one of: at least one position of the microphone associated with the processed at least one audio signal; at least one orientation of the microphone associated with the processed at least one audio signal; and at least one distance between the microphone associated with the processed at least one audio signal and a datum defined on the apparatus.

The datum defined on the apparatus may comprise the location of at least one further selected microphone.

The apparatus may be caused to perform displaying the at least one microphone operational parameter on a display of the apparatus.

The displaying the at least one microphone operation parameter on a display of the apparatus may cause the apparatus to perform: generating a graphical representation associated with the microphone operational parameter; and determining a location associated with the microphone on the display to display the graphical representation.

Generating a graphical representation associated with the microphone operational parameter may cause the apparatus to perform at least one of: generating a graphical representation of a functioning microphone for a fully functional microphone; generating a graphical representation of a faulty microphone for a faulty microphone; generating a graphical representation of a blocked microphone for a partially blocked microphone; and generating a graphical representation of a shadowed microphone for a shadowed microphone.

Determining a location associated with the microphone on the display to display the graphical representation may cause the apparatus to perform determining a display location adjacent the microphone of the microphone operational parameter.

Embodiments of the present application aim to address problems associated with the state of the art.

SUMMARY OF THE FIGURES

For better understanding of the present application, reference will now be made by way of example to the accompanying drawings in which:

FIGS. 5 and 6 show schematically an audio system with blocked microphones according to some embodiments.

EMBODIMENTS

Figure 1:
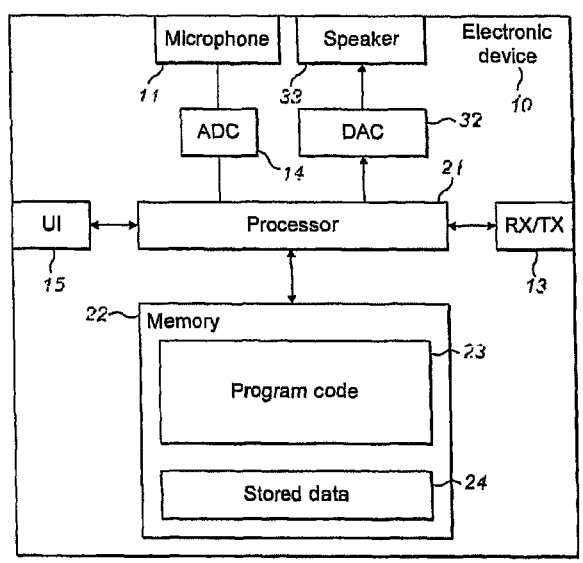
FIG. 1 shows schematically an apparatus suitable for being employed in some embodiments.

The following describes in further detail suitable apparatus and possible mechanisms for the provision of a detection of an impaired operation of a microphone and a selection between microphones based thereon.

A microphone can become blocked or otherwise impaired. This is not always obvious at the time of recording audio and only evident on the audio playback. For example if a user inadvertently blocks a microphone with their finger during audio recording, the blocked microphone will only become obvious to the user on hearing the impaired audio during playback. Additionally a blocked microphone on a telecommunication device such as for example a mobile phone may impair signal processing, such on apparatus carrying out a spatial audio capture. In the following description the term impaired, blocked, partially blocked or shadowed microphone would be understood to mean an impaired, blocked, shadowed or partially blocked mechanical component associated with the microphone. For example a sound port or ports associated with the microphone or microphone module. The sound ports, for example, are conduits which are acoustically and mechanically coupled with the microphone or microphone module and typically integrated within the apparatus. In other words the sound port or ports can be partially or substantially shadowed or blocked rather that the microphones being directly blocked or shadowed. In other words the term microphone can be understood in the following description and claims to define or cover a microphone system with suitably integrated mechanical components, and suitably designed acoustic arrangements such as apertures, ports, cavities. As such the characteristics of a microphone output signal can change when any of the integration parameters are impaired or interfered with. Thus a blocking or shadowing of a microphone port can be considered to be effectively the same as a blocking or shadowing of the microphone.

In the concept as described by embodiments herein by monitoring and analysing the microphone output signal an interfering effect can be determined which represents the effect of an impairment within the microphone, microphone module or associated mechanical components and accordingly a 'healthy' or clear microphone signal (in other words microphone, microphone module or associated mechanical components associated with a microphone not impaired, blocked or shadowed) can be selected.

Embodiments may be implemented in an audio system comprising three or more microphones where stereo capture is employed. However it would be understood that in some embodiments switching between two or more microphones can be implemented where mono capture is employed. For example embodiments as described herein can be implemented for conventional voice call capture and teleconferencing audio capture implementations. In some audio systems one or more microphones may be employed for audio capture. Embodiments may be implemented to identify a microphone with impaired operation in the audio system. Embodiments may select an additional microphone from the microphones in the audio system to take over the functionality of the blocked microphone. This selection may for example be based on a spatial proximity or orientation of the additional microphone. Furthermore in some embodiments as described herein the orientation of the apparatus can be taken into account in selecting at least one additional microphone from the microphones in the audio system to take over the functionality of the blocked microphone.

FIG. 1 shows an overview of a suitable system within which embodiments of the application can be implemented. FIG. 1 shows an example of an apparatus or electronic device 10. The electronic apparatus 10 may be used to record or listen to audio signals and may function as a recording apparatus.

The electronic apparatus 10 may for example be a mobile terminal or user equipment of a wireless communication system when functioning as the recording apparatus. In some embodiments the apparatus can be an audio recorder, such as an MP3 player, a media recorder/player (also known as an MP4 player), or any suitable portable apparatus suitable for recording audio or audio/video camcorder/memory audio or video recorder. For example the audio capture implementations can be part of an audio-video capture operation within the camcorder or video recorder. The electronic apparatus can be any suitable computer or processing apparatus with audio capture or processing capacity, for example: a personal computer, tablet, laptop, netbook, or smart phone.

The apparatus 10 may in some embodiments comprise an audio subsystem. The audio subsystem for example can comprise in some embodiments at least two microphone or array of microphones 11 for audio signal capture. In some embodiments the at least two microphones or array of microphones can be a solid state microphone, in other words capable of capturing audio signals and outputting a suitable digital format signal. In some other embodiments the at least two microphones or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro electrical-mechanical system (MEMS) microphone. In some embodiments the microphone 11 is a digital microphone array, in other words configured to generate a digital signal output (and thus not requiring an analogue-to-digital converter). The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means. In some embodiments the microphones are 'integrated' microphones containing both audio signal generating and analogue-to-digital conversion capability.

In some embodiments the apparatus 10 audio subsystems further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio subsystem can comprise in some embodiments a speaker 33. The speaker 33 can in some embodiments receive the output from the digital-to-analogue converter 32 and present the analogue audio signal to the user. In some embodiments the speaker 33 can be representative of multi-speaker arrangement, a headset, for example a set of headphones, or cordless headphones.

Although the apparatus 10 is shown having both audio capture and audio presentation components, it would be understood that in some embodiments the apparatus 10 can comprise only the audio capture part of the audio subsystem such that in some embodiments of the apparatus the microphones (for audio capture) are present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals. The processor 21 can be configured to execute various program codes. The implemented program codes can comprise for example audio recording and microphone switching or selecting routines. In some embodiments the processor can be configured to perform any suitable audio processing such as audio enhancement processing for acoustic echo cancellation, noise suppression, audio gain control. It would be understood that in some embodiments the audio processing can be performed within the audio subsystem under the control of the processor 21.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been processed in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10. In some embodiments the user interface 15 comprises touch sensors mounted adjacent or neighbouring the microphone ports and configured to determine the presence of the user's fingers, hands or other objects blocking the input of the microphones. In some embodiments the touch sensors may be enhanced or replaced by the employment of the touch screen or touch interface of the display. In some embodiments the touch technology can be configured to detect touch positions all over the device surface and not only on the display. This detection of 'hovering touch', in other words the presence of an object which is not in direct contact with the surface thus in some embodiments enables the touch screen to detect the user's hand (or other object) near to the device and in some embodiments near to the screen but over the microphone input port.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The coupling can, as shown in FIG. 1, be a transmission channel. The transceiver 13 can communicate with further apparatus by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (RDA).

It is to be understood again that the structure of the apparatus 10 could be supplemented and varied in many ways.

The concept of the embodiments described herein is the ability to identify an impaired operation of a microphone in an audio system and replace the functionality of the impaired microphone with an additional microphone in order to preserve audio quality of a recording. In some embodiments, during a recording function, an audio system may comprise active microphones carrying out the recording and passive or additional microphones. Embodiments may identify an impairment of an active microphone and replace the functionality of the impaired microphone with a passive microphone. In some embodiments, the passive microphone may replace the impaired active microphone in its active role.

Figure 2:
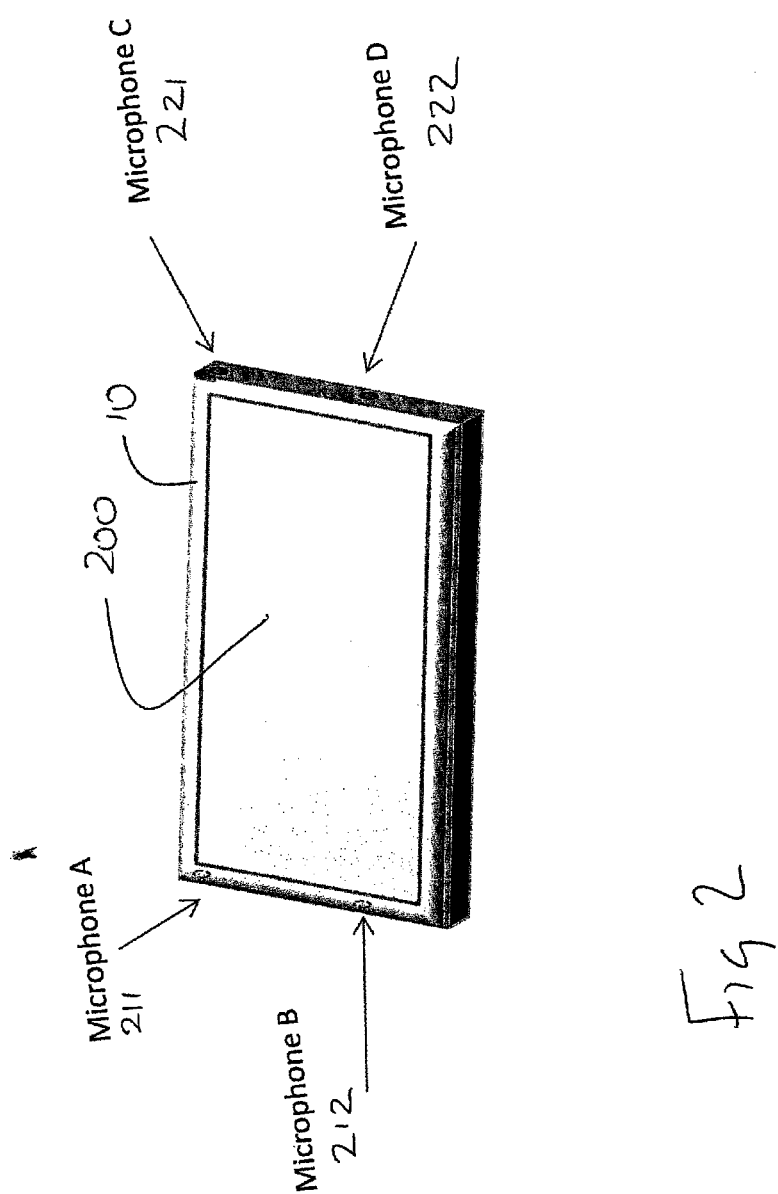
FIG. 2 shows schematically a microphone arrangement according to some embodiments.

FIG. 2 shows an example of a multiple microphone apparatus in which embodiments may be implemented.

Figure 5:
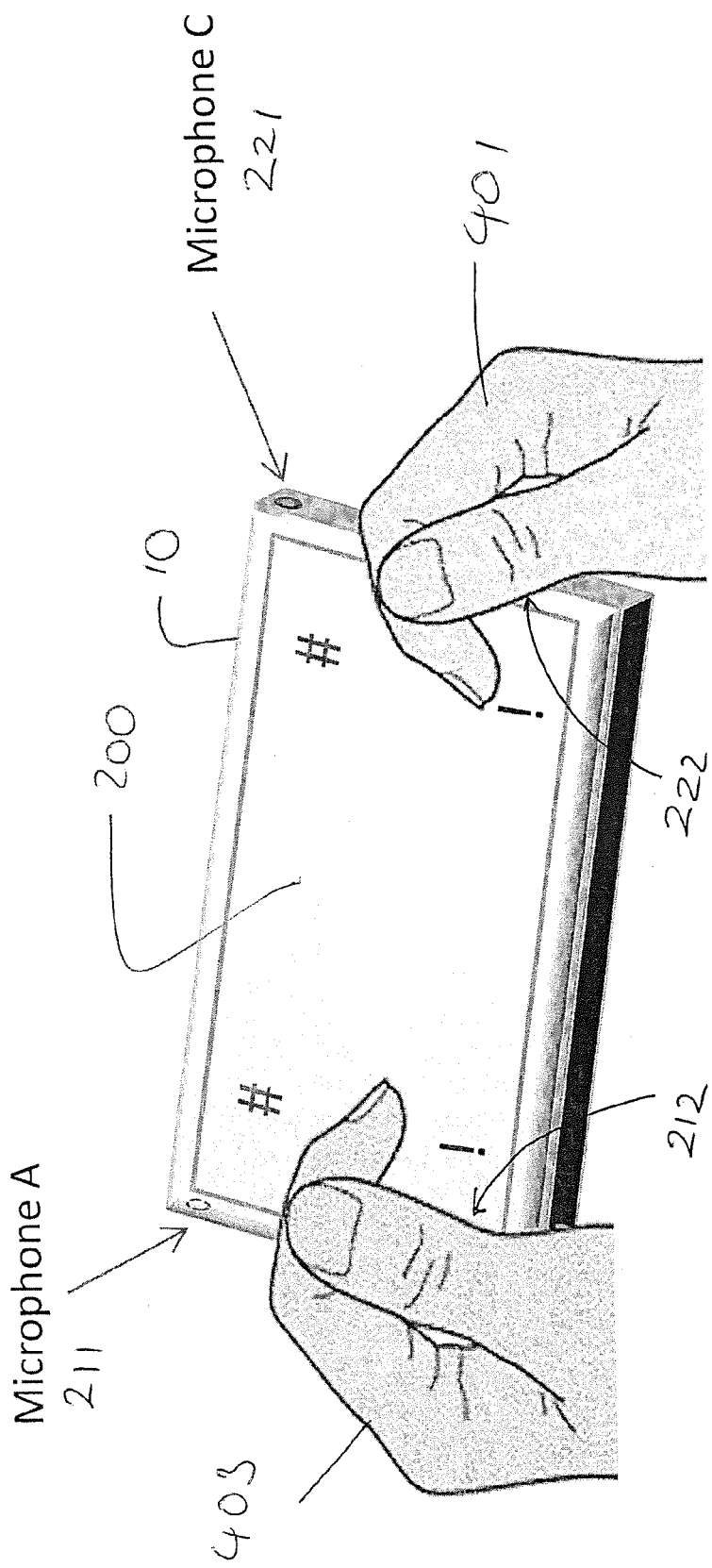

FIG. 2 shows an example of external view of the electronic apparatus 10. The apparatus 10 may comprise a display 200 or display means, a first microphone port corresponding to a first microphone (microphone A) 211, a second microphone port corresponding to a second microphone (microphone C) 221, a third microphone port corresponding to a third microphone (microphone B) 212 and a fourth microphone port corresponding to a fourth microphone (microphone D) 222. It will be appreciated that in some embodiments two of the microphones may be active or selected microphones and two microphones may be passive or not selected microphones for the purposes of recording. For example, the first and second microphones 211 and 221 may be selected microphones and the third and fourth microphones 212 and 222 may be not selected microphones. In some embodiments if the apparatus is operated in a first landscape mode as shown in FIG. 5 the first microphone 221 may also be considered to be located towards the top left side of the apparatus, the second microphone 221 a top right microphone, the third microphone 212 a bottom left microphone and the fourth microphone 222 a bottom right microphone. In the example shown in FIG. 5 a user holding the apparatus 10 may have a grip such that the user's left hand 403 blocks the third microphone 212 (blocked microphones shown by the exclamation mark) and the user's right hand 401 blocks the fourth microphone 221. In the case where audio is being recorded in the first mode, with the first microphone 211 and the second microphone 221 being active, some embodiments may determine or detect that the third microphone 221 and the fourth microphone 222 has been blocked and so as these are non-selected microphones no further action is required in selecting microphones.

In some embodiments the 'top' microphones may correspond to default microphones to carry out recording when a recording function of the apparatus is activated. Alternatively or additionally the electronic apparatus 10 may operate in a first mode in which the 'top' microphones are selected or active microphones and the 'bottom' microphones are passive microphones, and in a second mode where both the 'top' and 'bottom' microphones are active microphones.

When using a recording function of the apparatus 10, a user may hold the apparatus 10 and one or more of microphones may be blocked by the user's fingers. For example, such as shown in FIG. 6 a user holding the apparatus 10 may have a grip such that the user's left hand 503 blocks the third microphone 212 and the user's right hand 501 blocks the second microphone 221. In the case where audio is being recorded in the first mode, with the first microphone 211 and the second microphone 221 being active, some embodiments may determine or detect that the active microphones 221 has been blocked and switch the functionality of that active microphone 221 with one of the passive microphones 212 and 222. Furthermore, in some embodiments, on determining that the third microphone 212 is also blocked then the fourth microphone 222 is selected.

As shown in FIGS. 5 and 6 in some embodiments the apparatus can display the at least one microphone operational parameter on the display. In the example shown in FIGS. 5 and 6 the apparatus is shown displaying information that the microphones are either functional by generating a '#' symbol (or graphical representation) representing that the microphones are functional and generating a '!' symbol (or graphical representation) representing that the microphones are blocked or in shadow due to the user's fingers. It would be understood that in some embodiments the location of the symbol or graphical representation can be in any suitable location. For example in some embodiment the symbol or graphical representation can be located on the display near to the microphone location. However in some embodiments the symbol or graphical representation can be located on the display at a location near to the microphone location but away from any possible 'touch' detected area—otherwise the displayed symbol or graphical representation may be blocked by the same object blocking the microphone.

In some embodiments the apparatus or any suitable display means can be configured to generate a graphical representation associated with the microphone operational parameter; and determine the location associated with the microphone on the display to display the graphical representation. For example the apparatus can be configured in some embodiments to generate a graphical representation associated with the microphone operational parameter which comprises at least one of: generating a graphical representation of a functioning microphone for a fully functional microphone, such as the '#' symbol shown in FIGS. 5 and 6, generating a graphical representation of a faulty microphone for a faulty microphone, such as an image of a microphone with a line through it, generating a graphical representation of a blocked microphone for a partially blocked microphone, such as the T symbol shown in FIGS. 5 and 6, and generating a graphical representation of a shadowed microphone for a shadowed microphone.

It would be understood that in some embodiments the displayed graphical representation or symbol can be used as a user interface input. For example where the display shows a partially blocked or faulty microphone the user can touch or hover touch the displayed graphical representation to send an indicator to the control unit to control the audio signal input from the microphone (in other words switch the microphone on or off, control the mixing of the audio signal, control the crossfading from the microphone etc).

In some embodiments, the selection of a passive microphone to perform the functionality of the blocked active microphone to is determined on characteristics of the passive microphone. For example, the characteristics of the candidate replacement or passive microphones can be a similarity in physical position and/or orientation. In some embodiments carrying out spatial audio processing, the selection of the passive microphone may be based on the similarity of special audio characteristics of the passive microphone to the blocked active microphone.

In some embodiments, where audio recording mode involves all of the microphones in other words all of the microphones being selected or active, a detection of a blocked microphone may cause the recording mode to be changed to one in which only some of the microphones are selected (active). The functionality of the blocked active microphone may then be switched with a passive microphone.

Figure 3:
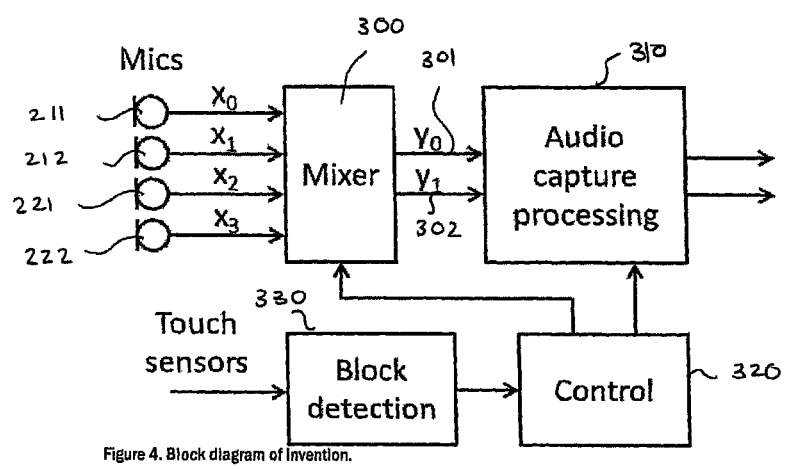
FIG. 3 shows schematically an audio system according to some embodiments.

FIG. 3 shows an example of an audio system of the apparatus 10 which can carry out an identification of a blocked microphone and switch the functionality of a blocked microphone with a candidate replacement microphone.

FIG. 3 comprises the first microphone 211, the second microphone 221, the third microphone 212 and the fourth microphone 222. The first microphone 211 may provide a first input signal X0 to a mixer 300. The second microphone 221 may provide a second input signal X2 to the mixer 300. The third microphone 212 may provide a third input signal X1 to the mixer 300. The fourth microphone may provide a fourth input signal X3 to the mixer 300.

The mixer 300 may select input signals corresponding to active microphones to provide a first active input signal 301 and a second active input signal 302 to an audio capture processing block 310. In some embodiments the mixer 300 can be configured to crossfade signals when one microphone signal is switched to another microphone signal to provide a smooth transition. The mixer 300 may be configured to receive a control signal from a control block 320. This control signal may indicate to the mixer which of the four input signals the mixer should select to provide to the audio capture processing block 310. The control block 320 may further provide a control signal to the audio capture processing block 310. The control block 320 may receive a signal from a block detection unit 330.

The block detection unit 330 may be configured to determine which, if any, of the microphones are blocked or impaired. The block detection unit 330 may receive information from touch sensors of the apparatus 10.

It will be appreciated that while the block detection unit 330 of FIG. 3 is shown as detecting whether a microphone has been at least partially blocked, the block detection unit 330 may also detect whether the operation of the microphone has been impaired by other means, for example the microphone is broken or deteriorated due to other factors.

In some embodiments the block detection unit 330 can receive inputs from the touch sensors in order to determine whether a microphone has been at least partially blocked. In some embodiments the block detection unit 330 can be configured to implement a "preventive detection with proximity" operation. With "preventive detection" the block detection unit 330 can in some embodiments be configured to detect an object (for example a hand, or any other potentially blocking item) which approaches the microphone area before it actually blocks the audio signal. In some embodiments the detection of an object approaching a microphone can be configured to trigger a measurement process based on or using the audio signals being generated by the microphones but with a longer interval (to save power in the measurement calculations) and furthermore prepare the control unit 320 to switch between microphones due to the increased probability based on the already made detection and when there is a clear determination of blocking in the measurements (enhanced amount of measurements has been launched before and blocking has been detected from that analysis). In other words the block detection unit 330 can conditionally trigger an audio signal analysis of the microphone signals (to accurately determine at least a partial blocking of a microphone) dependent on the touch sensor inputs (determining a potential blocking by an object being in proximity with a microphone).

In other words when an object is far from the microphone it is possible to use a first block detection method (method A) and when an object is approaching or coming nearer it is possible to use a second block detection method (block detection method B). In some embodiments the first block detection method rarely or only occasionally (e.g. once in every second) and when the object is approaching the detection method operational frequency is increased.

In some embodiments the block detection unit 330 can be configured to analyse the touch sensors data (forming a 3D field shape of the items it 'sees'). In such embodiments the data can be processed to generate a flag, with a value indicating whether an object is in proximity to a microphone) which in turn can be used in some embodiments to either trigger further analysis such as an audio signal analysis, or used in some embodiments to control the microphone switching algorithm.

In some embodiments the touch sensors can provide the data as 'hovering' data however in some embodiments the proximity detection or determination can be performed using any suitable proximity detection or determination sensing apparatus. For example in some embodiments a camera, or light sensor can be employed to determine an object in proximity to a microphone.

In some embodiments the proximity sensor or sensors can be located all around the apparatus and can be complemented by the hovering 'touch' sensor input on top or o the front and possibly rear of the apparatus. In such embodiments the combination of sensors can better enable this kind of proximity detection feature.

For example a potential use case is when a phone is laid on a table, and depending on the shape of the phone and the location of the microphones on the phone, the microphones facing the table surface are not used, since they may be blocked.

In some embodiments where the display (and therefore in such embodiments the touch/hovering sensor) wraps round the front face of the apparatus. In other words the display is extended and bent round the edges of a mobile device further expanding the touch/hovering detection field round the edges of a product. In such embodiments the microphones can be implemented under the display/hovering sensor panel and listen through microperforated holes in the display plastics to make them invisible to the end user. In some embodiments the touch/hovering sensor can be extension to cover the microphones without the display being extended.

In some embodiments the proximity detection for preventive detection can be performed such that the operation of detection or determination of the object in proximity to the microphone furthermore incorporates the size of the detected object as well as the proximity to the microphone.

For example in some embodiments there can be a two size approach to proximity detection performed by the block detection unit 330. Thus in some embodiments the block detection unit 330 can be configured to determine whether the object is small (finger sized) or large (hand sized). It would be understood that the number of object sizes can be any suitable number or division and similarly the range of sizes similarly arbitrarily decided.

Thus for example the block detection unit 330 can determine the following size ranges:
1) Finger/small object
2) Hand/larger object Furthermore in some embodiments the block detection unit 330 can be configured to determine the distance of the object from the apparatus. In some embodiments the combination of the distance and the size of the object can be used by the control unit 320 to control the processing of the microphone input signals.

Thus for example the finger/small object detection heading towards a microphone can trigger:
1a. Far distance (for example example: 15 cm): 'noticed' but no action taken by the control unit, i.e. no alarm to the system (too far & too small object, no threat),
1b. Mid range distance (1-10 cm): 'noticed' and control unit triggers microphone measurement to prepare to switch in case the object gets too close.
1c. Close range distance (1-0 cm): control unit triggered measurement of the blocking and control unit executes the microphone switch without user intervention Furthermore for example where the Hand/large object detection heading towards a microphone can trigger the following:
2a. Far distance (example 15 cm): 'noticed' and control unit triggers microphone measurement due to the large object in audio space.
2b. Mid range distance (1-10 cm): 'noticed', 'measured' and control unit executes the switch of the microphone.
2c. Close range distance (1-0 cm): blocked (or partially?) microphone not used, control unit triggers measurements to detect if the blocking object moves away to initiate switching back.

It would be understood that the example distances are approximate values where the hovering touch sensor can detect the objects in front of the sensor (or in the space which hovering effect creates on top and to the sides of a display panel).

It would be understood that the hovering touch sensor can be configured to create a field which extends also to the sides of the device where microphones are typically located.

A main use case for detecting blocked microphones is when user is keeping the device in their hands and the device is recording audio (such as shown in FIGS. 5 and 6). In such situations when a user's hand or finger position changes it may block microphones. In this case, embodiments of the application can be configured to detect a distance between hand and/or fingers (or a nearest possible object) and each of the microphones. In such embodiments the determination of blocking can apply to a finger that is touching the device all the time which may slide on the device surface and move towards a microphone and block the microphone.

Figure 4:
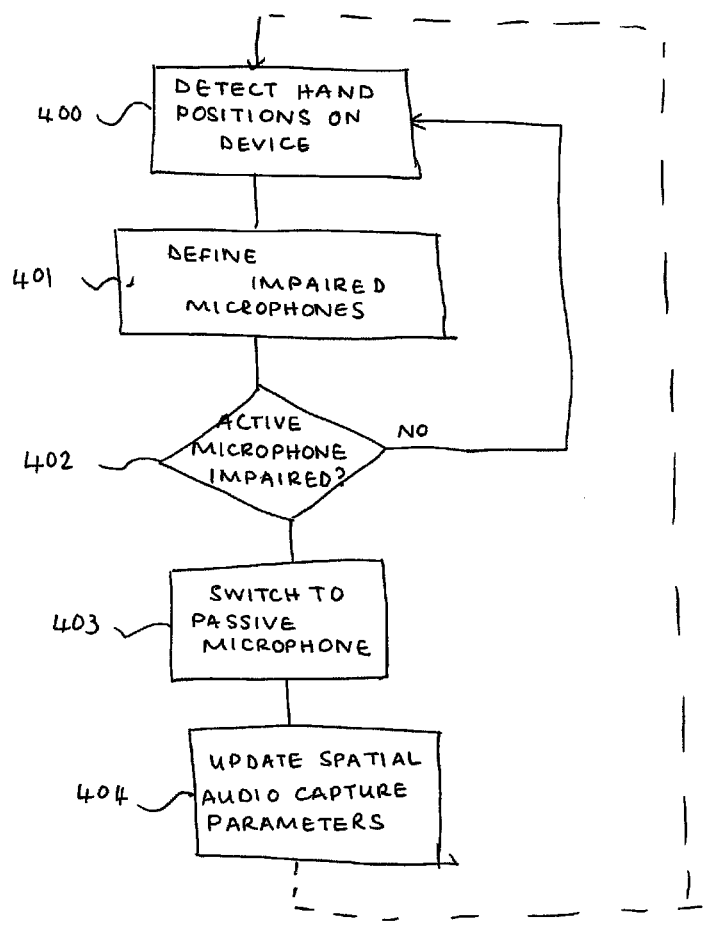
FIG. 4 shows schematically a flow diagram of the operation of an audio system according to some embodiments.

FIG. 4 shows the flow diagram of example method steps that may be carried out in accordance with the audio system as shown in FIG. 3.

At step 400, a detection of a hand position of a user on the apparatus 10 is made. For example, signals input from touch sensors of the apparatus 10 into the block detection unit 330 may provide an indication as to whether the position of a user's hand on the apparatus 10 is in the vicinity of one or more microphones.

At step 401, the impaired microphones are identified. This may correspond to the block detection units 330 receiving the indications from the touch sensors and making a determination if the touch sensors indicate that a user's finger is within a physical range of any of the microphones. In some embodiments, block detection unit 330 may also determine whether the position of the users hands are such that a microphone is likely to be blocked in the next movement of the user and/or the probability of a microphone being blocked with the user's hand in that position.

The method then progresses to step 403, where it is determined whether any of the active microphones are impaired. This may correspond to the block detection unit 330 providing information to the control unit 320 as to whether any of the microphones are blocked and the identity of those microphones. The control unit 320 may be aware of which microphones are currently active. For example the control unit 320 may be aware of the mode of recording of the apparatus 10, which microphones are active and/or whether spatial audio capture is taking place.

If at step 402 it is determined that none of the active microphones are impaired, the method returns to step 400 where the hand position on the apparatus 10 is monitored. If it is determined that an active microphone is impaired, the method progresses to step 403 where the functionality of the blocked active microphone is transferred to one of the passive microphones.

The switching of the functionality may be carried out by the control unit 320 determining which of the passive microphones to select as a suitable replacement for the impaired active microphone. For example, the control unit 320 may determine a physical vicinity of the passive microphones to the impaired active microphone and/or an orientation of the passive microphones and determine a suitable candidate for the transfer of the functionality of the impaired active microphone based on these characteristics.

For example, a microphone with the same or similar orientation of an impaired active microphone and/or in a dose physical vicinity to the impaired active microphone may be a good candidate to transfer to the functionality of active microphone. The controller may provide an indication of which inputs from which microphones the mixer 300 should select in order to provide input signals to the audio capture processing block at 310.

In some embodiments the control unit 320 can be configured to determine the switching of the functionality using a look-up or configuration table. For example the following table could be used by the control unit 320 to determine active or selected microphones according to the number of microphones or capture mode, the apparatus orientation, and a priority list from which the first entry on the list which does not have a blocked microphone is selected.

| Capture Mode | Apparatus orientation | Priority | Microphone Selection/ Combination | Params |
|---|---|---|---|---|
| Mono | Landscape | 1 | A | mic distances, equalization, ... |
|  |  | 2 | B |  |
|  |  | 3 | C |  |
|  |  | 4 | D |  |
|  | Portrait | 1 | A |  |
|  |  | 2 | B |  |
|  |  | 3 | C |  |
|  |  | 4 | D |  |
|  | "Sideways" | ... | ... | ... |

-continued

| Capture Mode | Apparatus orientation | Priority | Microphone Selection/ Combination | Params |
|---|---|---|---|---|
| Stereo | Landscape | 1 | A - C |  |
|  |  | 2 | B - D |  |
|  |  | 3 | A - D |  |
|  |  | 4 | B - C |  |
|  | Portrait | 1 | B - A |  |
|  |  | 2 | D - C |  |
|  |  | 3 | B - C |  |
|  |  | 4 | D - A |  |
|  | "Sideways" | ... | ... | ... |
| 3-channel | ... | ... | A - B - C | ... |

The control unit in some embodiments may therefore support a capture algorithm which supports various two-microphone combinations. Selecting the subset of microphones can for example be implemented by selecting microphones from the "Combination" column. As shown in the example table in some embodiments the microphones may be prioritized in such a way that a believed 'better' option (which for example produces a better signal combination) can be given a higher priority when multiple options are available. Furthermore as shown in the table after the subset of microphones are selected from the "Combination" column then the audio parameters from the column "params" can be read and used to update the capture trim audio parameters.

As described herein the apparatus orientation can be used as an input. In other words apparatus orientation detection can be performed and the input used to select microphones. For example in the table shown herein when the apparatus is operating in landscape (stereo) mode there are four possible active microphone combinations which can be employed in order to present a stereo audio image. For example where microphone A 211 is used, the other selected microphone can be either microphones C 221 or D 222. It would be understood that the microphones C 221 and D 222 are switchable, so if one of the microphones (C 221 or D 222) is blocked the other one can be used instead. Correspondingly where microphone A 211 is used, the microphones B 212 and C 221 are not switchable, in other words if microphones A 211 and C 221 are active microphones and microphone C 221 is blocked then microphone C 221 cannot be replaced with microphone B 212, since the stereo image would rotate 90 degrees and produce an unwanted effect. Furthermore it would be understood that the apparatus when operating in a portrait mode is configured such that microphone signals from microphones A 211 and C 221 are switchable.

As shown herein the lookup or configuration table can include sections for portrait and landscape orientation as well as other possible device orientations such as sideways, reverse landscape and reverse portrait. One possibility is to have sections in the table representing several orientations for one or each of the three rotational dimensions (roll, pitch, yaw). For example, there may be sections for yaw for every 10 degrees rotation resulting to totally 36 sections. These arrangements may be beneficial when there are very many microphones in the device.

In some embodiments when the apparatus is configured to perform a capture algorithm using more than two active microphones then the lookup or configuration table can be extended to support these configurations.

In some embodiments the control unit can be configured to switch microphones (in other words switch from one capture algorithm to another) when switching off active microphones. For example a 4 microphone capture mode becomes a 3 microphone capture mode when one microphone is switched off, a 3 microphone capture mode becomes a stereo capture mode when a further microphone is switched off, and so on. Similarly the switching on of microphones can cause the control unit to reconfigure which microphones are active. The switching on and off of the microphones can be performed based on a user interface input (for example the user switches from a stereo to mono mode or vice versa. In some embodiments as described herein the switching on or off of the microphones can be performed dependent on determining a fault or partial or full blockage of the microphone.

In some embodiments there can be more than one different stereo capture mode or capture algorithm available.

In some embodiments as described herein the number of active microphone signals may change when switching takes place. For example, when four active microphone signals are used and when one active microphone signal gets blocked in some embodiments an algorithm can be selected that uses only three active microphone signals. For example in some embodiments the microphone selection can be useful where too many microphones are blocked to maintain a recording or capturing setting that required a defined number of microphone signals and there are not enough microphone signals available. Similarly for the situation in some embodiments the apparatus can have only two microphones and stereo recording is selected, when user blocks one microphone the control unit can select the algorithm for mono capture. Furthermore the control unit can then be configured to employ the only unblocked microphone for capture and output a stereo signal where the left and right channel signals are the same. Although in such situations a stereo image is lost, the balance in the recording does not become unbalanced and turn towards the unblocked microphone.

The mixer 300 may select input signals from the first to fourth microphones based on the information received from the control block 320 and provide the selected signals 301 and 302 to the audio capture processing block 310. The audio capture processing block 310 may further process the signals and provide them either to be stored in a memory or to any suitable further processing step.

The method may then progress to step 404, where audio capture parameters are updated. This may be done by the controller 320 in order to compensate for the change in the physical position of active microphone being used for audio capture. It will be appreciated that this step is optional if audio capture parameter determination is not being carried out. An example of an audio capture parameter can be the active microphone distance. It would be understood that on selecting a different combination of microphones causes a change in the active microphone distance determination. Thus in some embodiments following the selection operation the controller 320 can be configured to recalculate, retrieve or generate the audio parameters so that in some embodiments the audio parameters can be used in further processing operations.

Thus for example when microphone switching takes place, the main audio capture parameter that in some embodiments is updated is the microphone's distances relatively to other active microphones. A further example of audio capture parameter which may be updated is that of equalization of microphone response when the switching or mixing of a new microphone takes place and the new microphone is of different type or if the new microphone is pointing to different direction than the old microphone.

In FIG. 4 an arrow from step 404 back to step 400 represents that in some embodiments the detection operations or steps described are one cycle of a continuous detection process.

It will be appreciated that while in the foregoing embodiments the impairment of a microphone has been determined based on sensors on an apparatus determining hand position, such impairment may be detected in another manner. For example, audio processing may take place to compare the power levels of signals input from the microphones in order to determine whether or not microphone is impaired. For example signals from an impaired microphone may be attenuated in comparison with the other microphones.

It will also be appreciated that the touch sensors may be on a display unit of the apparatus for example display unit 200 of the apparatus 10 and/or on the housing of the apparatus. The block detection unit 330 may determine whether the touch sensors indicate that the microphone port is being blocked or whether the probability of the port being blocked is high given a hand position.

The control unit 320 may further determine whether the recording is taking place in a mode where all the microphones are active and may additionally indicate to the mixer and audio processing unit that the mode has been changed into one in which only some of the microphones are active for audio capture. This may provide a passive microphone with which the functionality of an impaired active microphone may be switched.

The selection of a passive microphone to which the functionality of an impaired active microphone is to be switched may take into account the orientation of the apparatus. For example: if a user starts to capture using an apparatus in landscape orientation and then turns the apparatus to a portrait orientation, the orientation may influence the selection of a passive replacement microphone.

In some embodiments changing apparatus orientation can lead to switching the microphone selection operation performed by the control unit as for example the hand placement can block different microphones depending on how the apparatus is held.

For example, in landscape mode (from which the top-bottom orientation is described with respect to the four microphone example described herein) the control block 320 may consider that the functionality of the top right microphone 221 is switchable with the bottom right microphone 222. However, in portrait mode, the control block 320 may consider that the functionality of the top right microphone 221 is switchable with the top left microphone 211.

It will be appreciated that while four microphones have been given by way of example only, the invention may incorporate more microphones. For example some embodiments may implement N microphones and audio capture may be carried out using K microphone signals, where 1<K<=N.

In some embodiments the switching can be performed by the control unit seamlessly. In such embodiments the user does not need to know whether they are blocking the microphones during the capture (in other words visual feedback is not necessary). As described herein the suitable microphones from the candidate microphone list can be detected automatically and switched into use when necessary.

In some embodiments a sufficient redundancy of microphones is required in order to implement the embodiments. For example a spatial capture algorithm using 3 microphone signals may require 6 carefully placed microphones so to be able to compensate most situations. Furthermore in some embodiments a stereo capture or recording may require 4 microphones to enable sufficient redundancy.

In some embodiments the control unit can be configured to control the processing of N microphones while K active signals are needed, K<=N according to the following modes:

Firstly all N microphone signals are processed (for example used for noise suppression, automatic gain control (agc). In such embodiments all of the signals are fed to audio capture processing with blocked microphone detection signals. From these signals audio capture processing selects internally the K 'best' microphone signals. Each subset of K-signals can have their own processing parameters that are used when this particular subset is used.

Secondly the active microphone selection is performed at first, so microphone algorithms are processed for the microphone signals that do not originate from a blocked microphone. In these embodiments where there are very many microphones available this can save power by allowing the switching of microphones on and off in runtime. In these embodiments the selected K signals are fed to audio capture processing with indication of the selected microphone combination (in other words the selected subset). The spatial processing can use the processing parameters for the selected subset.

Furthermore in some embodiments a combination of the first and second cases can be implemented, where some processing for microphone signals can be performed before selecting active microphones and some additional processing for the selected active microphones.

In some embodiments an apparatus can comprise 2+2 microphones. The apparatus could be located in a pocket (for example a front pocket of trousers or in a pocket of a jacket) or loose in a bag or container. In such circumstances one end of the apparatus sits at the bottom of the pocket/container while the other end is either freely exposed to record the audio waves from the air (or generally in a better position to record audio than the other microphone). In some embodiments the block detection unit 330 can be configured to detect, by measuring the microphone levels, when this occurs and the control unit select the better microphone or microphones as the recording input and close the other microphones down as a recording input. In such situations the block detection unit 330 and control unit 320 prevents the recording of noises via the microphones deep in the pocket/container which would ruin the recording or seriously weaken it.

Although in the embodiments described herein there has been a focus on audio capture use cases it would be understood that other audio signal processing operations can benefit from the application of the embodiments. For example microphone selection and processing as described herein can be applied to uses such as teleconferencing and normal call when multi-microphone based noise control (ANC) is in use.

It shall be appreciated that the electronic apparatus 10 may be any apparatus incorporating an audio recordal system for example a type of wireless user equipment, such as mobile telephones, portable data processing apparatus or portable web browsers, as well as wearable apparatus.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing apparatus, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   initiating a sound capture event;
   receiving at least two audio signals during the sound capture event, wherein the at least two audio signals are provided by at least two microphones including first and second microphones associated with first and second microphone ports, respectively, of an electronic device;

determining at least one microphone operational parameter indicative of at least the first microphone being at least partially blocked, shadowed or faulty based upon determining information indicative of an object that blocks or is proximate to at least the first microphone port; and controlling the sound capture event by selecting the audio signals received by the second microphone via the second microphone port of the electronic device to be processed while eliminating reliance upon audio signals received by the first microphone via the first microphone port of the electronic device with respect to the sound capture event based on the at least one microphone operational parameter.

2. The method as claimed in claim 1, wherein determining at least one microphone operational parameter based on the received at least two audio signals comprises at least one of:

determining at least one of the at least two microphones are at least partially blocked;

determining at least one of the at least two microphones are faulty;

determining at least one of the at least two microphones are shadowed;

determining an orientation of the electronic device comprising the at least two microphones; or determining a capture mode for the at least two audio signals from the at least two microphones.

3. The method as claimed in claim 2, wherein determining at least one of the at least two microphones are at least partially blocked or determining at least one of the at least two microphones are shadowed comprises:

determining at least one object is proximate to the at least one of the at least two microphones; or defining the at least one microphone as at least partially blocked or shadowed.

4. The method as claimed in claim 3, wherein determining at least one object is proximate to the at least one of the at least two microphones comprises at least one of:

determining at least one touch position is proximate to the at least one of the at least two microphones; or determining an at least partially enveloping object is proximate to the at least one of the at least two microphones.

5. The method as claimed in claim 3, wherein determining at least one object is proximate to the at least one of the at least two microphones comprises:

defining at least two regions from the at least one of the at least two microphones; and determining the at least one object is within at least one of the at least two regions.

6. The method as claimed in claim 5, wherein controlling the sound capture event comprises:

determining at least one processing parameter where the at least one object is located within a farther of the at least two regions; and applying the at least one processing parameter to process the at least one of the at least two audio signals where the at least one object is located within a nearer of the at least two regions.

7. The method as claimed in claim 1, wherein determining at least one microphone operational parameter comprises determining whether at least one of the at least two microphones are at least partially blocked by:

determining the at least one microphone operational parameter using a first determining method performed at a first frequency in an instance in which at least one object is located within a farther of at least two regions from the electronic device; and determining the at least one microphone operational parameter using a second determining method performed at a second frequency, the second frequency being greater than the first frequency, in an instance in which the at least one object is located within a nearer of the at least two regions.

8. The method as claimed in claim 2, wherein determining the capture mode for the at least two audio signals from the at least two microphones comprises determining an output audio signal format comprising at least one channel audio signal.

9. The method as claimed in claim 1, wherein controlling the sound capture event comprises at least one of:

controlling switching an additional microphone on;

controlling switching the first microphone associated with the audio signal off; or controlling splitting an audio signal received by the second microphone into at least two channels.

10. The method as claimed in claim 9, further comprising processing the at least one of the at least two audio signals based on the at least one parameter, wherein processing the at least one of the at least two audio signals based on the at least one parameter comprises at least one of:

switching an additional microphone on;

switching the first microphone associated with the audio signal off; or splitting an audio signal received by the second microphone into at least two channels.

11. The method as claimed in claim 1, further comprising determining a processing parameter associated with the processing of the at least two audio signals based on the at least one microphone operational parameter, wherein the processing parameter comprises at least one of:

at least one position of the second microphone associated with the processed at least one audio signal;

at least one orientation of the second microphone associated with the processed at least one audio signal; or at least one distance between the second microphone associated with the processed at least one audio signal and a datum defined on the electronic device wherein the datum comprises the location of at least one further selected microphone.

12. The method as claimed in claim 1, further comprising displaying the at least one microphone operational parameter on a display of the electronic device.

13. The method as claimed in claim 12, wherein displaying the at least one microphone operation parameter on a display of the electronic device comprises:

generating a graphical representation associated with the microphone operational parameter; and determining a location associated with at least one of the first or second microphones on the display to display the graphical representation.

14. The method as claimed in claim 13, wherein generating the graphical representation associated with the microphone operational parameter comprises at least one of:

generating a graphical representation of a functioning microphone for a fully functional microphone;

generating a graphical representation of a faulty microphone for a faulty microphone;

generating a graphical representation of a blocked microphone for a partially blocked microphone; or generating a graphical representation of a shadowed microphone for a shadowed microphone.

15. The method as claimed in claim 13, wherein determining the location associated with at least one of the first or second microphones on the display to display the graphical representation comprises determining a display location adjacent to at least one of the first or second microphones of the microphone operational parameter.

16. An apparatus comprising:
a controller configured to initiate a sound capture event;
at least two microphones including first and second microphones configured to capture at least two audio signals for the sound capture event via first and second microphone ports, respectively, of an electronic device;
a detector configured to determine at least one microphone operational parameter indicative of at least the first microphone being at least partially blocked, shadowed or faulty based upon determining information indicative of an object that blocks or is proximate to at least the first microphone port; and
an audio capture processor configured to process at least one of the at least two audio signals;
wherein the controller is configured to control the sound capture event by selecting the audio signals received by the second microphone via the second microphone port of the electronic device to be processed while eliminating reliance upon audio signals received by the first microphone via the second microphone port of the electronic device with respect to the sound capture event based on the at least one microphone operational parameter.

17. The apparatus as claimed in claim 16, wherein the detector is configured to determine at least one of:
at least one of the at least two microphones are at least partially blocked;
at least one of the at least two microphones are faulty;
at least one of the at least two microphones are shadowed;
an orientation of the apparatus comprising the at least two microphones; or
a capture mode for the at least two audio signals from the at least two microphones.

18. The apparatus as claimed in claim 17, wherein the detector configured to determine at least one of the at least two microphones are at least partially blocked or at least one of the at least two microphones are shadowed comprises:
a sensor configured to determine at least one object is proximate to the at least one of the at least two microphones.

19. An apparatus comprising at least one processor and at least one memory including computer code for one or more programs, the at least one memory and the computer code configured to with the at least one processor cause the apparatus at least to:
initiate a sound capture event;
receive at least two audio signals during the sound capture event, wherein the at least two audio signals are provided by at least two microphones including first and second microphones associated with first and second microphone ports, respectively, of an electronic device;
determine at least one microphone operational parameter indicative of at least the first microphone being at least partially blocked, shadowed or faulty based upon determining information indicative of an object that blocks or is proximate to at least the first microphone port; and
control the sound capture event by selecting the audio signals received by the second microphone via the second microphone port of the electronic device to be processed while eliminating reliance upon audio signals received by the first microphone via the second microphone port of the electronic device with respect to the sound capture event based on the at least one microphone operational parameter.

20. The apparatus as claimed in claim 19, wherein the determined at least one microphone operational parameter causes the apparatus to at least one of:
determine at least one of the at least two microphones are at least partially blocked;
determine at least one of the at least two microphones are faulty;
determine at least one of the at least two microphones are shadowed;
determine an orientation of the apparatus comprising the at least two microphones; or
determine a capture mode for the at least two audio signals from the at least two microphones.

21. The apparatus as claimed in claim 19 wherein the at least one memory and the computer code are configured to with the at least one processor cause the apparatus to control the sound capture event by switching off the first microphone.

22. The apparatus as claimed in claim 21 wherein the at least one memory and the computer code are configured to with the at least one processor cause the apparatus to control the sound capture event by activating an additional microphone to receive audio signals.

23. The method as claimed in claim 1 wherein controlling the sound capture event comprises switching off the first microphone.

24. The method as claimed in claim 23 wherein controlling the sound capture event comprises activating an additional microphone to receive audio signals.

25. The apparatus as claimed in claim 16 wherein the controller is configured to control the sound capture event by switching off the first microphone.

26. The apparatus as claimed in claim 25 wherein the controller is configured to control the sound capture event by activating an additional microphone to receive audio signals.

27. The method as claimed in claim 1 wherein determining information indicative of an object that blocks or is proximate to at least the first microphone port comprises determining information from a touch sensor indicative of the object that blocks or is proximate to the first microphone port.

28. The method as claimed in claim 1 wherein initiating the sound capture event comprises activating and relying upon a microphone that was previously passive with the microphone that is activated being chosen based upon its similarity in position, orientation or spectral characteristics relative to the first microphone upon which reliance has been eliminated.

29. The method as claimed in claim 1 wherein determining information indicative of an object that blocks or is proximate to at least the first microphone port comprises determining information regarding a size of the object that blocks or is proximate to at least the first microphone port, and wherein controlling the sound capture event comprises differently controlling the sound capture event dependent upon both proximity and size of the object that blocks or is proximate to at least the first microphone port.

30. The method as claimed in claim 1 wherein initiating the sound capture event comprises activating and relying upon a microphone that was previously passive with the microphone that is activated being chosen based upon an orientation of the apparatus.

31. The method as claimed in claim 1 wherein controlling the sound capture event comprises switching from stereo to mono mode in which left and right channel signals are identical.

32. The apparatus as claimed in claim 18, wherein the detector configured to determine at least one of the at least two microphones are at least partially blocked or at least one of the at least two microphones are shadowed further comprises a microphone identifier configured to define the at least one microphone as at least partially blocked or shadowed.

33. The method as claimed in claim 1, wherein determining information indicative of an object that blocks or is proximate to at least the first microphone port comprises receiving information from a sensor that is utilized to determine that at least one object is proximate to the at least one of the at least two microphones.

34. The apparatus as claimed in claim 19, wherein the at least one memory and the computer code are configured to with the at least one processor cause the apparatus to determine information indicative of an object that blocks or is proximate to at least the first microphone port by receiving information from a sensor that is utilized to determine at least one object is proximate to the at least one of the at least two microphones.

\* \* \* \* \*